(12) United States Patent
Calhoon et al.

(10) Patent No.: US 6,365,993 B1
(45) Date of Patent: Apr. 2, 2002

(54) ROUND LINEAR ACTUATOR UTILIZING FLAT PERMANENT MAGNETS

(75) Inventors: Glenn Arthur Calhoon, Aliquippa; Paul Thomas Bottegal, Lower Burrell; Robert Joseph Rinefierd, Irwin; Francois Jean Marchand, Pittsburgh; Robert Michael Slepian, Murrysville, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/544,862

(22) Filed: Apr. 7, 2000

(51) Int. Cl.[7] ............................................... H02K 41/00
(52) U.S. Cl. ........................................... 310/12; 310/30
(58) Field of Search .............................. 310/12–15, 30; 335/179, 229

(56) References Cited

U.S. PATENT DOCUMENTS

| 4,315,197 | A | * | 2/1982 | Studer | 318/135 |
| 4,387,935 | A | * | 6/1983 | Studer | 310/90.5 |
| 4,439,699 | A | * | 3/1984 | Brende et al. | 310/13 |
| 4,883,994 | A | * | 11/1989 | Nikura | 310/12 |
| 5,471,100 | A | * | 11/1995 | Sakamoto et al. | 310/12 |
| 5,952,742 | A | * | 9/1999 | Stoiber et al. | 310/12 |
| 6,066,998 | A | * | 5/2000 | Trumper et al. | 335/229 |

* cited by examiner

*Primary Examiner*—Joseph Waks
(74) *Attorney, Agent, or Firm*—Martin J. Moran

(57) ABSTRACT

A linear actuator which includes a housing assembly, a shaft assembly disposed within the housing assembly, a plurality of flat magnets disposed within said housing about said shaft, and a structure to support the magnets. Because the magnets are flat magnets, the components that support the magnets may be machined with tolerances that virtually eliminate the air gap between the magnets and the support structures.

22 Claims, 3 Drawing Sheets

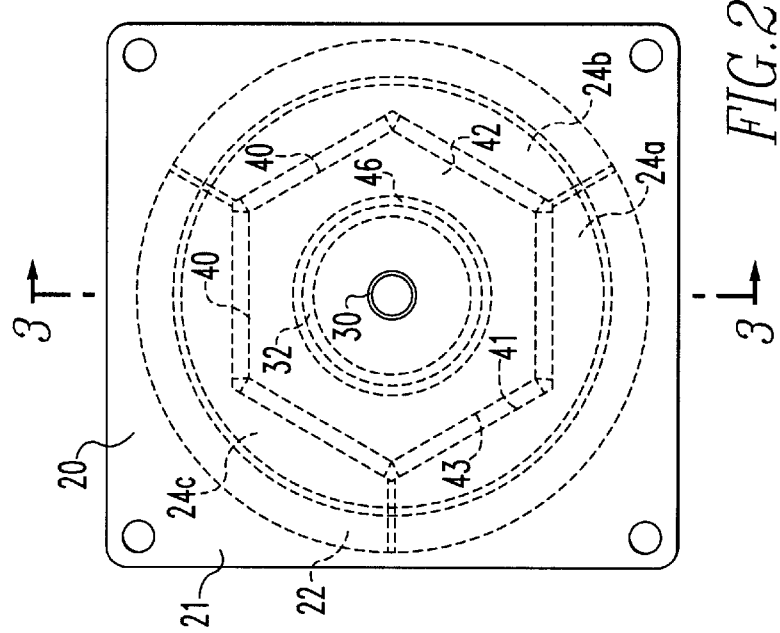
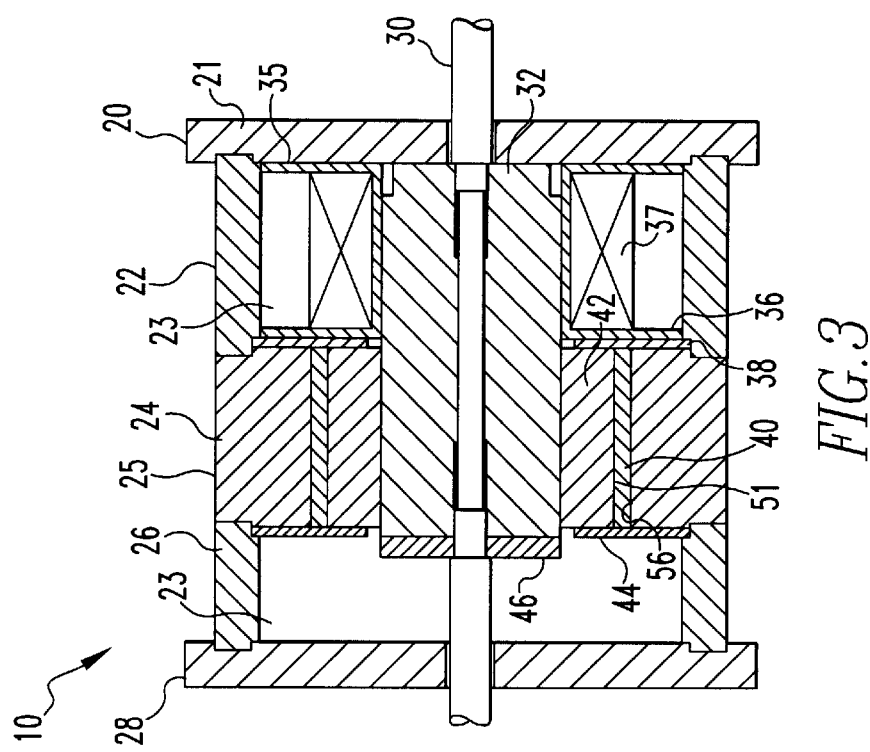

ROUND LINEAR ACTUATOR UTILIZING FLAT PERMANENT MAGNETS

FIELD OF THE INVENTION

The present invention relates to a linear actuator and, more specifically, to a linear actuator which incorporates flat magnets.

BACKGROUND OF THE INVENTION

A typical linear actuator of the prior art consists of a housing which encloses a cylindrical coil and a cylindrical magnet. The coil and magnet are disposed about a shaft or armature which moves axially within the housing. When the coil is not energized, the shaft is in a first position. When the coil is energized, the shaft moves axially to a second position. The sealing force, the force maintaining the shaft in either the first or second position, is created by a magnet which passes magnetic flux through the shaft. The strength of the sealing force is a function of the amount of air gap between the shaft and the magnet. Sealing force decreases as the air gap between the magnet and the shaft increases. Magnetic flux is also transferred through elements of the housing. Accordingly, the sealing force also decreases as the total air gap between the magnet and the housing components increases.

Because the amount of force exerted on the shaft is a function of the air gap between the magnets and the shaft and/or the total air gap between the magnet and the components of the housing, it is desirable to minimize the air gap. As shown in FIG. 1, prior art linear actuators use cylindrical magnets 1 having a cylindrical hole therethrough. The cylindrical magnet is typically held on a magnet carrier 2 which is disposed within the cylindrical hole, between the magnet and the shaft 3. The magnet is further enclosed within a protective housing 4. Thus, there are three circular interfaces in linear actuators in the prior art. It is difficult, however, to machine components having tight tolerances with a cylindrical interface. As shown on FIG. 1, circular holes may be slightly elliptical or oversized, resulting in an air gap 5,6,7. The sealing force created by the magnet could be increased if the air gap 5, 6, 7 between the shaft and magnet and/or the total air gap between the magnet and housing could be reduced. Additionally, production costs could be reduced if the cylindrical interface were not used.

Therefore, there is a need for a linear actuator that reduces the air gap between the magnet carrier and the shaft.

There is a further need for a linear actuator that reduces the total air gap between the magnet and the housing components.

There is a further need for a linear actuator that is easily manufactured with a minimal air gap.

SUMMARY OF THE INVENTION

These needs and others are satisfied by the present invention, which is directed to a linear actuator, which utilizes a plurality of flat magnets spaced about the linear actuator's shaft As with prior art linear actuators, the invention includes a housing which encloses a coil and which has a shaft passing through the coil and housing. In place of the typical cylindrical magnet, however, is a plurality of flat magnets. The flat magnets are sandwiched between a magnet support ring, which forms a portion of the housing, and a magnet carrier which is adjacent to the shaft. Because the magnets are flat, both the magnet support ring and the magnet carrier are easily machined so that the average gap between the magnet and either the magnet support ring or the magnet carrier is less than 0.001 inch. Additionally, because the magnets are flat, the present invention, requires only one circular interface, unlike the prior art which includes three circular interfaces. With a smaller air gap between the flat magnets and their support structures, the actuator provides a greater sealing force.

BRIEF DESCRIPTION OF THE DRAWINGS

A full understanding of the invention can be gained from the following description of the preferred embodiments when read in conjunction with the accompanying drawings in which:

FIG. 2 is a top view of a linear actuator according to the present invention.

FIG. 3 is a cross sectional view taken along line 3—3 of FIG. 2.

FIG. 4 is a detail view of a section of the magnet support ring. Specifically.

DETAILED DESCRIPTION OF THE PREFERRED EMBODIMENT

Figure 1:
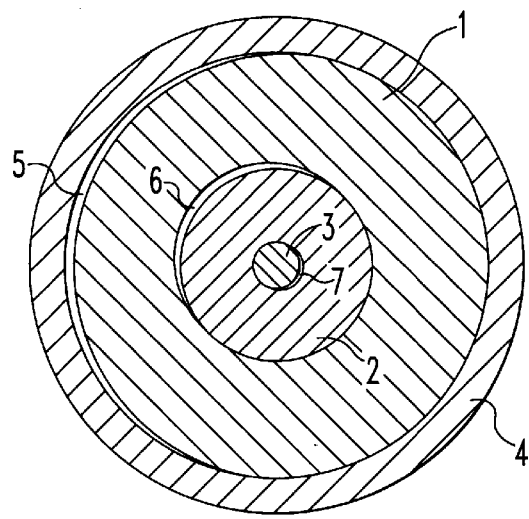
FIG. 1, prior art linear actuators showing air gaps.

A linear actuator 10 according to the present invention is shown in FIGS. 2 and 3. As shown on FIG. 3, the linear actuator 10 includes a housing 20 which is formed of a top plate 21, a top cylinder 22, a magnet support ring 24, a bottom cylinder 26, and a bottom plate 28. The top plate 21 is coupled to the top cylinder 22. The top cylinder 22 is coupled to the top plate 21 on one end, and to the magnet support ring 24 or the other end. The magnet support ring 24 is further coupled to the bottom cylinder 26. Bottom cylinder 26 is coupled on one end to the magnet support ring 24 and on the other end to bottom plate 28. In the preferred embodiment, the top plate 21 and bottom plate 28 are square. Top cylinder 22 and bottom cylinder 26 are hollow, forming upper and lower cavities 23 and 27 respectively. Top plate 21 and bottom plate 28 each has a medial opening passing therethrough. The medial openings are aligned. Shaft 30 is slidably disposed through both medial openings. Shaft 30 is preferably cylindrical. Shaft 30 may have an enlarged plunger body 32 disposed between the top plate 21 and bottom plate 28. The plunger body 32 is preferably cylindrical and disposed about shaft 30. The housing 20 and the magnet carrier 42 (described below) are made of magnetically permeable material, i.e. a material with low reluctance.

A coil assembly 35, which includes a coil support 36 and wire 37 is disposed within upper cavity 23. The coil support 36 is a torid having a U-shaped cross section. Wire 37, preferably 500 turns of 18-gauge magnet wire, is wrapped around coil support 36. Coil assembly 35 is coupled to an electric source (not shown). A medial opening passes through coil support 36. Shaft 30 and/or plunger body 32 are slidably disposed in the coil support 36 medial opening.

Figure 4C:
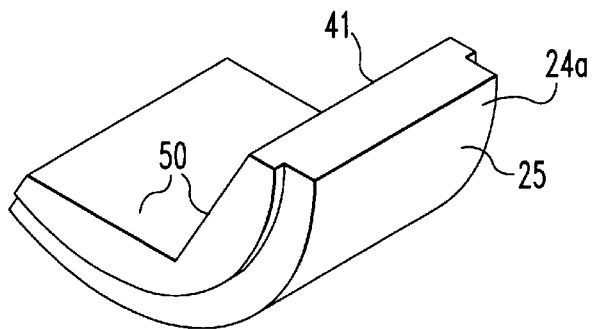
FIG. 4C shows an isometric view of a segment.
Figure 4A:
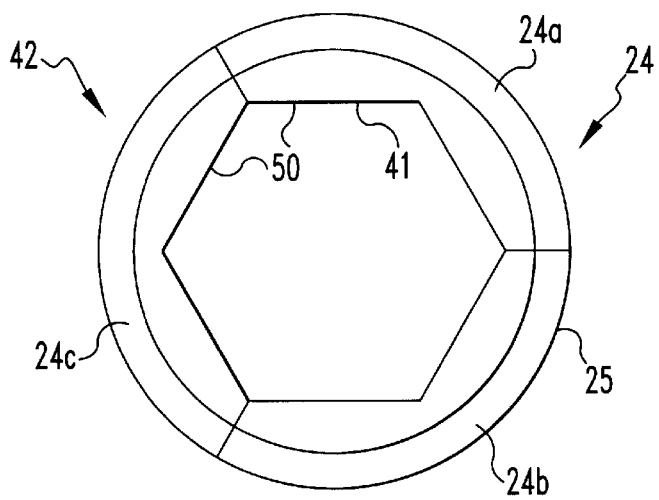
FIG. 4A shows a plurality of sections forming a ring.
Figure 4B:
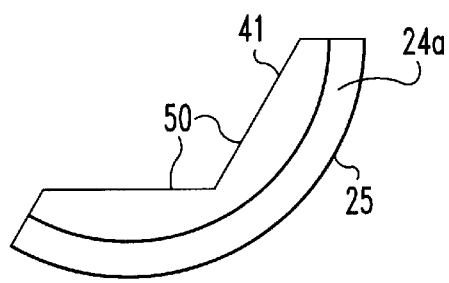
FIG. 4B shows an individual segment.

The magnet support ring 24 may be any shape, however, as shown on FIGS. 4A, 4B, and 4C the magnet support ring 24 preferably has a cylindrical outer surface 25 and an inner surface 41 forming a plurality of flat surfaces 50. In the preferred embodiment there are six flat surfaces 50 evenly spaced about the inner surface 41. The magnet support ring 24 may be formed of three 120° segments 24a, 24b, 24c.

A plurality of flat magnets 40 are disposed adjacent to and contacting each inner surface 41. Preferably flat magnets 40 are evenly spaced angularly about shaft 30. The flat magnets 40 are planar and rectangular. The flat magnets 40 are preferably made from a rare earth material such as neodymium iron boron (NdFeB), Alnico, Ferrite, Samarium Cobalt, or ceramic. Rare earth magnets tend to maintain their magnetism longer than other materials. The flat magnets 40 are sandwiched between the inner surface 41 of magnet support ring 24 and the outer surface 43 of magnet carrier 42. Preferably, flat magnets 40 are each perpendicular to a radius of shaft 30. The outer surface 43 of magnet carrier 42 has a plurality of flat surfaces 51 opposing each flat surface 50 on the magnet support ring. Magnet carrier 42 also has a cylindrical medial opening passing therethrough. Shaft 30 and/or plunger body 32 pass through the medial opening in magnet carrier 42. Flat magnets 40 are held between magnet support ring 24 and magnet carrier 42 by cylindrical caps 38, 44. Magnet cap 38 is disposed between coil assembly 35 and magnet support ring 24 and magnet carrier 42. Magnet cap 44 is disposed in lower cavity 27, contacting magnet support ring 24 and magnet carrier 42. Both magnet caps 38, 44 have medial openings. Shaft 30 and/or plunger body 32 is slidably disposed through the medial openings in magnet caps 38, 44.

Because the magnets 40 are flat, the inner surface 41 of magnet support ring 24 and outer surface 43 of magnet carrier 42 can be machined to have virtually no air gap between the magnets 40 and surfaces 50, 51. The average air gap between flat magnets 40 and magnet support ring 24 is approximately 0.001 inch. The average air gap between flat magnets 40 and magnet carrier 42 is approximately 0.001 inch. Additionally, the components of the housing 20, top plate 21, a top cylinder 22, a magnet support ring 24, a bottom cylinder 26, and a bottom plate 28, each have a flat interface between the respective adjacent parts. These flat surfaces can also be machined to have virtually no air gap. The average total air gap between the components of the housing 20 is approximately 0.001 inch or less. Because each of the surfaces 50, 51 that contact the flat magnets 40 are also flat, the cost of manufacturing the magnet support ring 24 and magnet carrier 42 to tight tolerances is reduced.

In operation, shaft 30 may be positioned in either a first position, with plunger body 32 adjacent to top plate 21, or a second position, with plunger body 32 adjacent to bottom plate 28. Coil assembly 35 my be energized by an electric source. By varying the polarity of the electric source, the current through the coil assembly 35 may travel in different directions. When the current through coil assembly 35 travels in a first direction, the coil assembly 35 creates a magnetic field which draws the shaft 30 into the first position. When the current through coil assembly 35 travels in a second direction, the coil assembly 35 creates a magnetic field which draws the shaft 30 into the second position. When the coil in not energized, the shaft 30 is maintained in either the first or second position by the sealing force created by flat magnets 40. The sealing force is created by magnetic flux passing through plunger body 32 and housing 20. The smaller the air gap between the magnets 40 and the housing 20 and the magnet carrier 42 the greater the sealing force.

Figure 5:
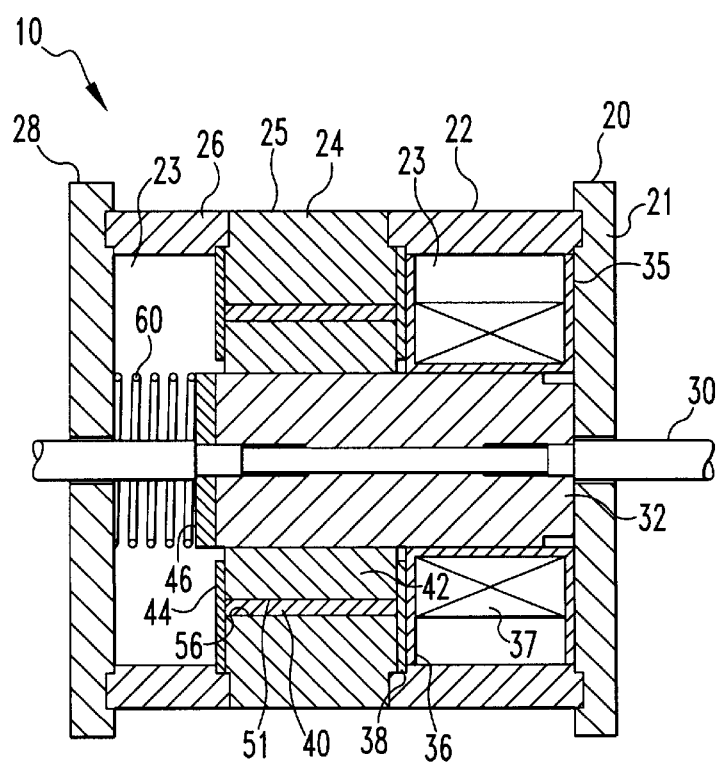
FIG. 5 is a cross sectional view of an alternate embodiment incorporating a spring.

In an alternate embodiment, shaft 30 is biased in a first position by an external force, such as a spring (not shown) or, as shown in FIG. 5, a spring 60 may be disposed in lower cavity 27. When coil assembly 35 is energized, a magnetic field is created which acts on the plunger body 32 with enough force to overcome the force of the external force or spring 60 and draw the plunger body 32 to a second position adjacent to bottom plate 28. The plunger body 32 is held in the second position by the sealing force created by the flat magnets 40.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A linear actuator comprising:
   a housing assembly;
   a shaft assembly slidably disposed within said housing, said shaft assembly having two opposing ends, said ends protruding from opposite sides of said housing;
   a plurality of flat magnets disposed within said housing about said shaft;
   a magnet carrier disposed about said shaft assembly;
   said magnet carrier having an exterior side; said exterior side having a plurality of flat surfaces;
   said flat magnets are supported by said magnet carrier flat surfaces; and
   wherein the average air gap between said magnets and said magnet carrier is less than 0.001 inch.

2. The linear actuator of claim 1 wherein:
   a portion of said housing assembly is a magnet support ring having an interior side, said magnet support ring interior side having a plurality of flat surfaces aligned with said flat surfaces on said exterior side of said magnet carrier; and
   said magnets disposed between said magnet carrier exterior side and said magnet support ring interior side.

3. The linear actuator of claim 2, wherein the average air gap between said magnets and said magnet support ring is less than about 0.001 inch.

4. The linear actuator of claim 3, wherein said flat magnets are evenly angularly distributed about said shaft.

5. The linear actuator of claim 4, wherein said flat magnets are each oriented perpendicular to a radius of said shaft.

6. The linear actuator of claim 5, wherein said housing assembly further includes:
   a top plate;
   a top cylinder;
   a bottom cylinder;
   a bottom plate;
   said top plate adjacent to said top cylinder;
   said top cylinder disposed between said top plate and said magnet support ring;
   said magnet support ring disposed between said top cylinder and said bottom cylinder;
   said bottom cylinder disposed between said magnet support ring and said bottom plate;
   said bottom plate disposed adjacent to said bottom cylinder.

7. The linear actuator of claim 6 wherein the average total air gap between said top plate, said top cylinder, said magnet support ring, said bottom cylinder and said bottom plate is less than about 0.001 inch.

8. The linear actuator of claim 7, wherein said plurality of magnets comprises 6 magnets.

9. The linear actuator of claim 8, wherein said magnet carrier exterior side has six flat sides.

10. The linear actuator of claim 9, wherein said magnet support ring has an outer side, said outer side having a cylindrical cross-section substantially the same diameter as said top cylinder and said bottom cylinder, said interior side having six flat sides.

11. The linear actuator of claim 10, wherein said flat magnets are made from neodymium iron boron.

12. The linear actuator of claim 10, wherein said flat are made from a rare earth material selected from the group consisting of Alnico, Ferrite, Samarium Cobalt, and ceramic.

13. The linear actuator of claim 10, wherein said housing assembly includes:

a coil assembly disposed in said housing encircling said shaft;

said shaft is movable in an axial direction between a first position and a second position; and wherein energizing said coil with a current having a first polarity drives said shaft to said first position.

14. The linear actuator of claim 13, wherein said housing assembly includes:

a spring disposed within said housing;

said shaft is biased in said first position by said spring.

15. The linear actuator of claim 13, wherein energizing said coil with a current having a second polarity drives said shaft to said second position.

16. The linear actuator of claim 2, wherein said flat magnets are made from neodymium iron boron.

17. The linear actuator of claim 2, wherein said flat magnets are made from a rare earth material selected from the group consisting of Alnico, Ferrite, Samarium Cobalt, and ceramic.

18. The linear actuator of claim 2, wherein said housing assembly includes:

a coil assembly disposed in said housing encircling said shaft;

an electric source;

said coil is coupled to said electric source; and said shaft is movable in an axial direction between a first position and a second position; and energizing said coil biases said shaft in said second position.

19. The linear actuator of claim 2, wherein said housing assembly includes:

a spring;

said shaft is biased in said first position by said spring.

20. The linear actuator of claim 19, wherein the average air gap between said magnets and said magnet support ring is less than about 0.001 inch.

21. The linear actuator of claim 20, wherein said flat magnets are evenly angularly distributed about said shaft.

22. The linear actuator of claim 21, wherein said flat magnets are each oriented perpendicular to a radius of said shaft.

* * * * *